US012339427B2

(12) United States Patent
Childs et al.

(10) Patent No.: US 12,339,427 B2
(45) Date of Patent: Jun. 24, 2025

(54) EQUIRECTANGULAR LENS FOR VIRTUAL REALITY VIDEO

(71) Applicant: Foshan Limited, Victoria (SC)

(72) Inventors: Trevor Childs, Windsor (CA); Matthew Loucks, Harrow (CA)

(73) Assignee: Foshan Limited, Victoria (SC)

( * ) Notice: Subject to any disclaimer, the term of this patent is extended or adjusted under 35 U.S.C. 154(b) by 298 days.

(21) Appl. No.: 17/101,324

(22) Filed: Nov. 23, 2020

(65) Prior Publication Data

US 2021/0157109 A1 May 27, 2021

Related U.S. Application Data

(60) Provisional application No. 62/938,991, filed on Nov. 22, 2019.

(51) Int. Cl.
| | | |
|---|---|---|
| *G02B 15/14* | (2006.01) | |
| *G02B 5/20* | (2006.01) | |
| *G02B 13/06* | (2006.01) | |
| *G02B 13/18* | (2006.01) | |
| *G02B 15/20* | (2006.01) | |
| *G02B 27/00* | (2006.01) | |
| *H04N 5/76* | (2006.01) | |
| *H04N 23/698* | (2023.01) | |

(52) U.S. Cl.
CPC ............. *G02B 13/18* (2013.01); *G02B 5/208* (2013.01); *G02B 13/06* (2013.01); *H04N 5/76* (2013.01); *H04N 23/698* (2023.01)

(58) Field of Classification Search
CPC .... G02B 13/06; G02B 13/18; G02B 13/0005; G02B 5/208; H04N 5/23238; H04N 5/76; H04N 23/698
USPC ................................ 359/725, 668, 649, 664
See application file for complete search history.

(56) References Cited

U.S. PATENT DOCUMENTS

| | | | |
|---|---|---|---|
| 2014/0340767 A1* | 11/2014 | Mori ..................... | G02B 13/004 359/715 |
| 2018/0120545 A1* | 5/2018 | Aihara ................... | G01C 11/02 |
| 2020/0133095 A1* | 4/2020 | Cotoros ............. | G02B 27/0006 |
| 2021/0096335 A1* | 4/2021 | Zhao ..................... | G02B 13/06 |
| 2021/0096346 A1* | 4/2021 | Matsumura ............ | G02B 15/22 |
| 2022/0252848 A1* | 8/2022 | Kurtz ..................... | G02B 13/18 |

* cited by examiner

*Primary Examiner* — Thomas K Pham
*Assistant Examiner* — Kuei-Jen L Edenfield
(74) *Attorney, Agent, or Firm* — The Dobrusin Law Firm, PC

(57) ABSTRACT

An equirectangular lens is provided and is used in connection with a video camera to record in virtual reality without requiring post-recording software editing to put the video footage in virtual reality format. The lens is a compound camera lens with an aspherical (i.e. not spherical) and rotationally asymmetrical (such as a rounded square with irregular topography) lens element configured to capture a 180° field of view. This type of lens produces an equirectangular image on the camera sensor which is optimal and required for filming virtual reality video.

3 Claims, 4 Drawing Sheets

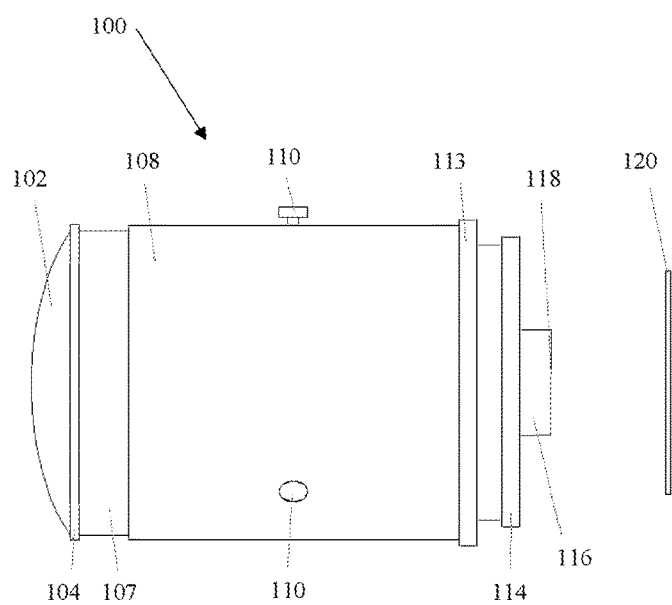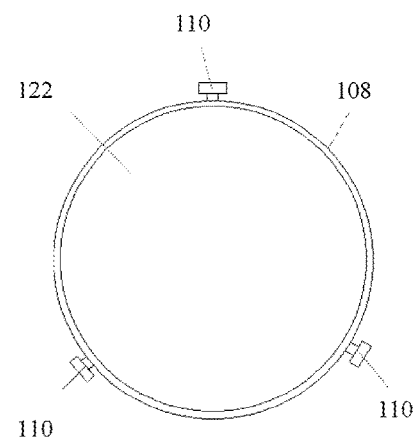
FIG. 3
FIG. 4

EQUIRECTANGULAR LENS FOR VIRTUAL REALITY VIDEO

This application claims priority and benefit to Provisional Patent Application Ser. No. 62/938,991 filed on Nov. 22, 2019.

TECHNICAL FIELD

The present specification generally relates to a lens for a camera and, more specifically, a lens for recording virtual reality video without necessitating post recording software editing.

BACKGROUND

Virtual reality (hereinafter referred to as "VR") is an interactive computer-generated experience taking place within a simulated environment. It incorporates mainly auditory and visual feedback, but may also allow other types of sensory feedback like haptic. This immersive environment can be similar to the real world or it can be fantastical, creating an experience that is not possible in ordinary physical reality. Augmented reality systems may also be considered a form of VR that layers virtual information over a live camera feed into a headset or through a smartphone or tablet device giving the user the ability to view three-dimensional images.

Current VR technology most commonly uses virtual reality headsets or multi-projected environments, sometimes in combination with physical environments or props, to generate realistic images, sounds and other sensations that simulate a user's physical presence in a virtual or imaginary environment. A person using virtual reality equipment is able to "look around" the artificial world, move around in it, and interact with virtual features or items. The effect is commonly created by VR headsets consisting of a head-mounted display with a small screen in front of the eyes but can also be created through specially designed rooms with multiple large screens.

Typically, VR footage is recorded with a fisheye lens and post recoding software modifies the footage to be in VR format.

Accordingly, a need exists for alternative means for recording VR without necessitating, or at least minimizing, post recording software involvement.

SUMMARY

In one embodiment, an equirectangular lens is used in connection with a video camera to record in virtual reality without requiring post-recording software editing to put the video footage in virtual reality format.

In other embodiments, other similarly shaped lenses with rounded, squared, curved, square, or otherwise asymmetrical may be used to achieve the same or similar virtual reality output without necessitating the need for post recording software editing to put the footage into virtual reality format.

A lens assembly for recording virtual reality video footage is provided, the lens assembly including at least one spherical glass capture lens. Further, a plurality of aspherical lenses are provided, the plurality of aspherical lenses having a non-spherical and free-form configuration. Next the assembly includes a plurality of glass focusing lenses, the plurality of aspherical lenses positioned between the at least one spherical glass capture lens and the plurality of glass focusing lenses and an IR cut filter positioned adjacent to the plurality of glass focusing lenses. In this assembly, the plurality of aspherical lenses warp the image into an equirectangular configuration.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 depicts a side view of the external lens according to one or more embodiments shown and described herein;

FIG. 4 depicts a front view of the external lens according to one or more embodiments shown and described herein.

DETAILED DESCRIPTION

An equirectangular lens is used in connection with a video camera to record in virtual reality without requiring post-recording software editing to put the video footage in virtual reality format. The lens is a compound camera lens with at least one aspherical (i.e. not spherical) and rotationally asymmetrical (such as a rounded square with irregular topography) lens element configured to capture a 180° field of view This type of lens produces an equirectangular image on the camera sensor which is optimal and required for filming virtual reality video. Various embodiments of the lens and the operation of the lens will be described in more detail herein.

Asymmetrical lenses, also known as free-form lenses or aspherical, is defined as a lens having a non-symmetrical shape different from a traditional spherical lens (such as a fisheye lens). In inclusion of the asymmetrical lens takes a traditional circle image (such as illustrated in FIG. 1) and warps said image into a rectangle (or square) image, such as illustrated in FIG. 2.

Figure 1:
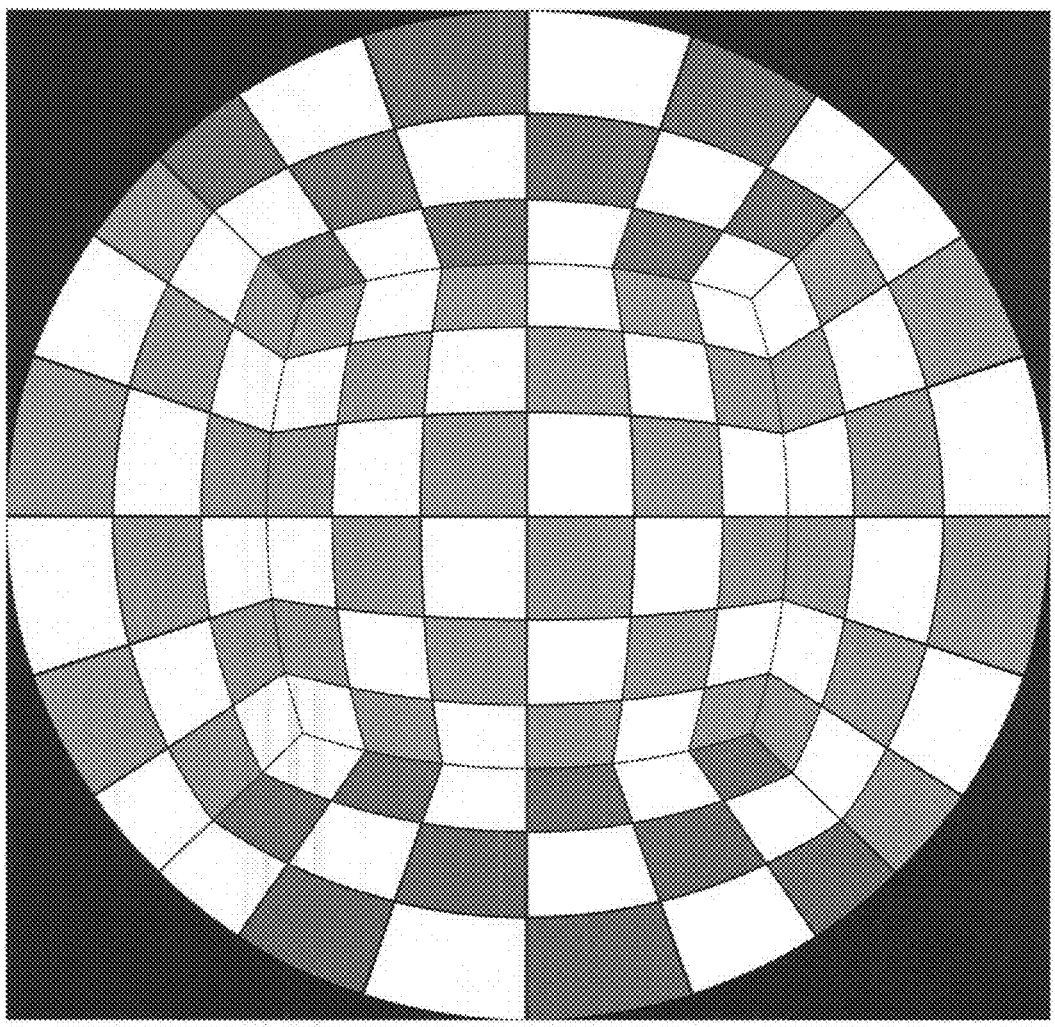
FIG. 1 depicts a projection of a typical fisheye lens of the prior art.
Figure 2:
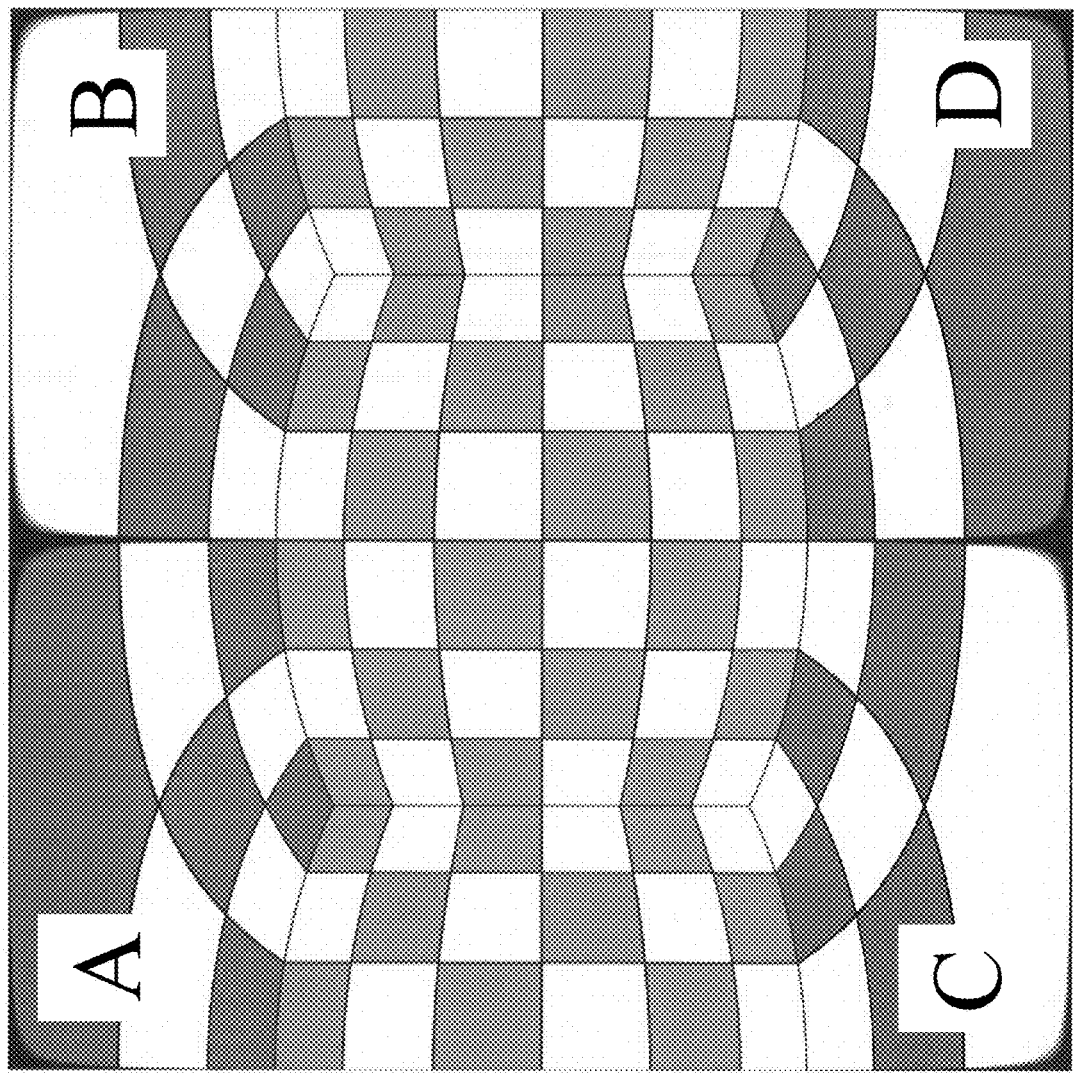
FIG. 2 depicts an equirectangular lens projection according to one or more embodiments shown and described herein.

Referring now to FIG. 2 (whereby FIG. 1 is herein considered prior art), a projection of an equirectangular lens is shown. As shown in comparison to FIG. 1 (prior art), which is a traditional fish eye lens projection, the areas A, B, C and D (which are traditional lost areas of camera capture), are now entirely filled in and utilized by the equirectangular lens projection as illustrated in FIG. 2. This, accordingly, captures the 180° field of view.

The lens producing the projection of FIG. 2 is a compound camera lens with an aspherical and rotationally asymmetrical lens element that captures a 180° field of view which produces an equirectangular image on the camera sensor.

Figure 5:
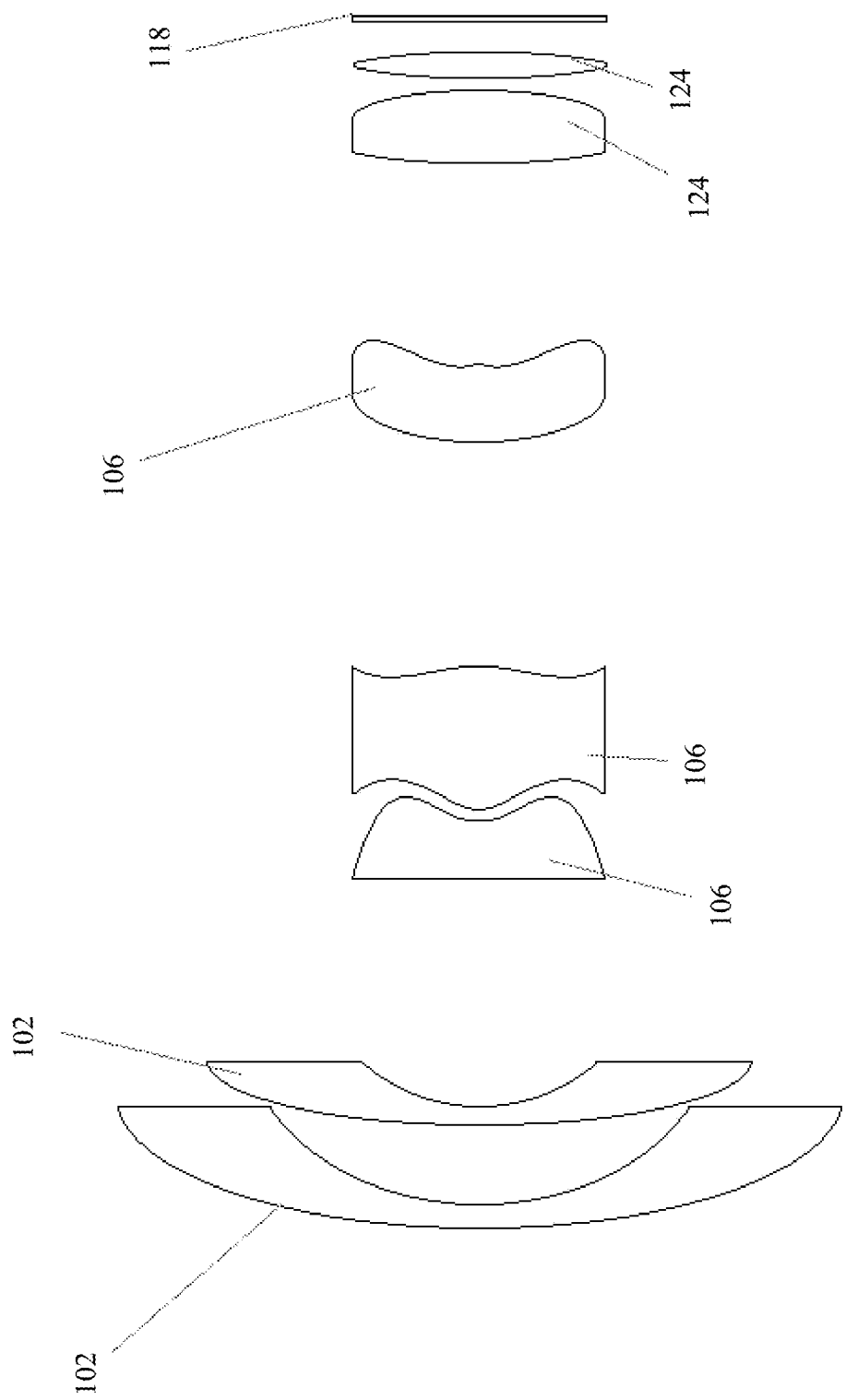
FIG. 5 depicts an exploded side view of the plurality of lenses within the lens assembly according to one or more embodiments shown and described herein.

FIG. 3 generally depicts a lens 100 having a free form lens embedded therein. The lens assembly 100 includes an outer casing 108 and an assembly casing 107. The internal lens assembly (such as shown in FIG. 5) is fixed to the assembly outer casing 108, which can move telescopically as well as rotationally inside the outer casing 108. The outer casing 108 is fixed to a c-mount 114 and can be tightened with a back grip ring 113. Image focus and alignment is achieved by moving the assembly (using a front grip ring 114) then locking it in place using three lock pins 110.

The front lenses 102 of the assembly 100 resemble those of a fisheye lens, capturing light from an extreme wide-angle field. The aspherical lenses 106 warp the image into an equirectangular configuration. The final elements are a traditional set of focusing lenses followed by a non-refractory IR cut filter 118.

It is possible that only two aspherical elements would be required, depending on the size and mounting of the lens as well as what material the elements are made of. For a c-mount lens with a target sensor size of 11 mm, three aspherical elements are estimated.

A lens assembly for recording virtual reality video footage, the lens assembly including at least one spherical glass capture lens 112. Further, a plurality of aspherical lenses 106 are provided, the plurality of aspherical lenses 106 having a non-spherical and free-form configuration. Next the assembly includes a plurality of glass focusing lenses 124, the plurality of aspherical lenses 106 positioned between the at least one spherical glass capture lens and the plurality of glass focusing lenses and an IR cut filter 118 positioned adjacent to the plurality of glass focusing lenses. In this assembly, the plurality of aspherical lenses warp the image into an equirectangular configuration.

The lens assembly includes a C-mount connection 114 to the camera body. The lens will also have a through-the-lens (TTL) metering of no greater than 70 mm and a maximum width (including lens housing) no greater than 65 mm. The lens will be fixed aperture where the aperture should range from F2.0 to F2.8. The lens design of the present embodiment is designed for a Sony® IMX253 sensor, with a target image square of 11 mm on the sensor.

The focal distance will range from 15 cm to infinity with 180° field of view in front of the lens (lens horizon forward to the zenith) should be mapped to the 11 mm square in an equirectangular projection. Any additional image beyond that edge will be discarded in post-production, but is not required to be physically blocked by the lens design.

Furthermore, the distortion (f-theta) must be lower than 1% for as required by virtual reality playback to appear correctly. Relative illumination must remain above 70% to avoid vignetting. Thermal considerations are comparable to other lenses (where a typical range is −10° to +50° C.). An infrared cut filter (at 650 nm) will also be incorporated into one of the flat optical elements.

The mathematical mapping of an equirectangular half-dome lens is described in the forgoing. The x and y components on the sensor (Euclidean coordinates) are mapped proportionally to the longitude and latitude (spherical coordinates) of the field of view. This produces only minor warping in the center of the image, mild warping at the left and right edges, and extreme warping at the top and bottom of the image.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

What is claimed is:

1. A lens assembly for recording virtual reality video footage to produce an equirectangular image on a camera sensor, the lens assembly comprising:
   at least one spherical glass capture lens configured to capture an image;
   a plurality of aspherical lenses, the plurality of aspherical lenses configured to warp the image into the equirectangular image, the plurality of aspherical lenses having a non-spherical and free-form configuration, each of the plurality of aspherical lenses also being asymmetric;
   a plurality of glass focusing lenses, the plurality of aspherical lenses positioned between the at least one spherical glass capture lens and the plurality of glass focusing lenses; and
   an IR cut filter positioned adjacent to the plurality of glass focusing lenses;
   the lens assembly producing the equirectangular image on the camera sensor required for virtual reality video without requiring post-recording software editing to put the video footage in virtual reality format.

2. The lens assembly of claim 1 wherein the plurality of aspherical lenses is two aspherical lenses.

3. The lens assembly of claim 1 wherein the plurality of aspherical lenses is three aspherical lenses.

* * * * *